United States Patent
Meredith (10) Patent No.: US 9,645,945 B2
(45) Date of Patent: May 9, 2017

(54) FILL PARTITIONING OF A SHARED CACHE

(71) Applicant: IMAGINATION TECHNOLOGIES, LTD., Kings Langley (GB)

(72) Inventor: Jason Meredith, Hemel Hempstead (GB)

(73) Assignee: Imagination Technologies Limited, Kings Langley (GB)

( * ) Notice: Subject to any disclaimer, the term of this patent is extended or adjusted under 35 U.S.C. 154(b) by 271 days.

(21) Appl. No.: 14/153,240

(22) Filed: Jan. 13, 2014

(65) Prior Publication Data

US 2014/0201452 A1 Jul. 17, 2014

(30) Foreign Application Priority Data

Jan. 14, 2013 (GB) .................................. 1300580.6

(51) Int. Cl.
*G06F 12/12* (2016.01)
*G06F 12/128* (2016.01)
(Continued)

(52) U.S. Cl.
CPC .......... *G06F 12/128* (2013.01); *G06F 12/127* (2013.01); *G06F 12/084* (2013.01); *G06F 12/0842* (2013.01)

(58) Field of Classification Search
CPC ............... G06F 12/084; G06F 12/0842; G06F 12/0848; G06F 12/0871; G06F 12/127; G06F 12/128
(Continued)

(56) References Cited

U.S. PATENT DOCUMENTS 6,205,519 B1 * 3/2001 Aglietti ................. G06F 12/128
711/126
6,745,292 B1 6/2004 Stevens
(Continued)

FOREIGN PATENT DOCUMENTS

EP 1612683 6/2005

OTHER PUBLICATIONS

Combined Search and Examination Report under Section 17 and 18(3) (6pgs), dated Aug. 8, 2013, as cited in GB Application 1300580.6.

*Primary Examiner* — Gary Portka
(74) *Attorney, Agent, or Firm* — Vorys, Sater, Seymour and Pease LLP; Vincent M DeLuca (57) ABSTRACT

Fill partitioning of a shared cache is described. In an embodiment, all threads running in a processor are able to access any data stored in the shared cache; however, in the event of a cache miss, a thread may be restricted such that it can only store data in a portion of the shared cache. The restrictions to storing data may be implemented for all cache miss events or for only a subset of those events. For example, the restrictions may be implemented only when the shared cache is full and/or only for particular threads. The restrictions may also be applied dynamically, for example, based on conditions associated with the cache. Different portions may be defined for different threads (e.g. in a multi-threaded processor) and these different portions may, for example, be separate and non-overlapping. Fill partitioning may be applied to any on-chip cache, for example, a L1 cache.

19 Claims, 7 Drawing Sheets

(51) Int. Cl.
*G06F 12/127* (2016.01)
*G06F 12/084* (2016.01)
*G06F 12/0842* (2016.01)

(58) Field of Classification Search
USPC ............. 711/129, 130, 133, 134, 159, 173
See application file for complete search history.

(56) References Cited

U.S. PATENT DOCUMENTS

| | | |
|---|---|---|
| 7,415,575 B1 | 8/2008 | Tong |
| 2005/0160228 A1* | 7/2005 | Teruyama ............. G06F 12/127 |
| | | 711/133 |
| 2010/0318742 A1* | 12/2010 | Plondke ................ G06F 12/121 |
| | | 711/123 |
| 2011/0055827 A1 | 3/2011 | Lin |

\* cited by examiner

FILL PARTITIONING OF A SHARED CACHE

BACKGROUND

Figure 1:
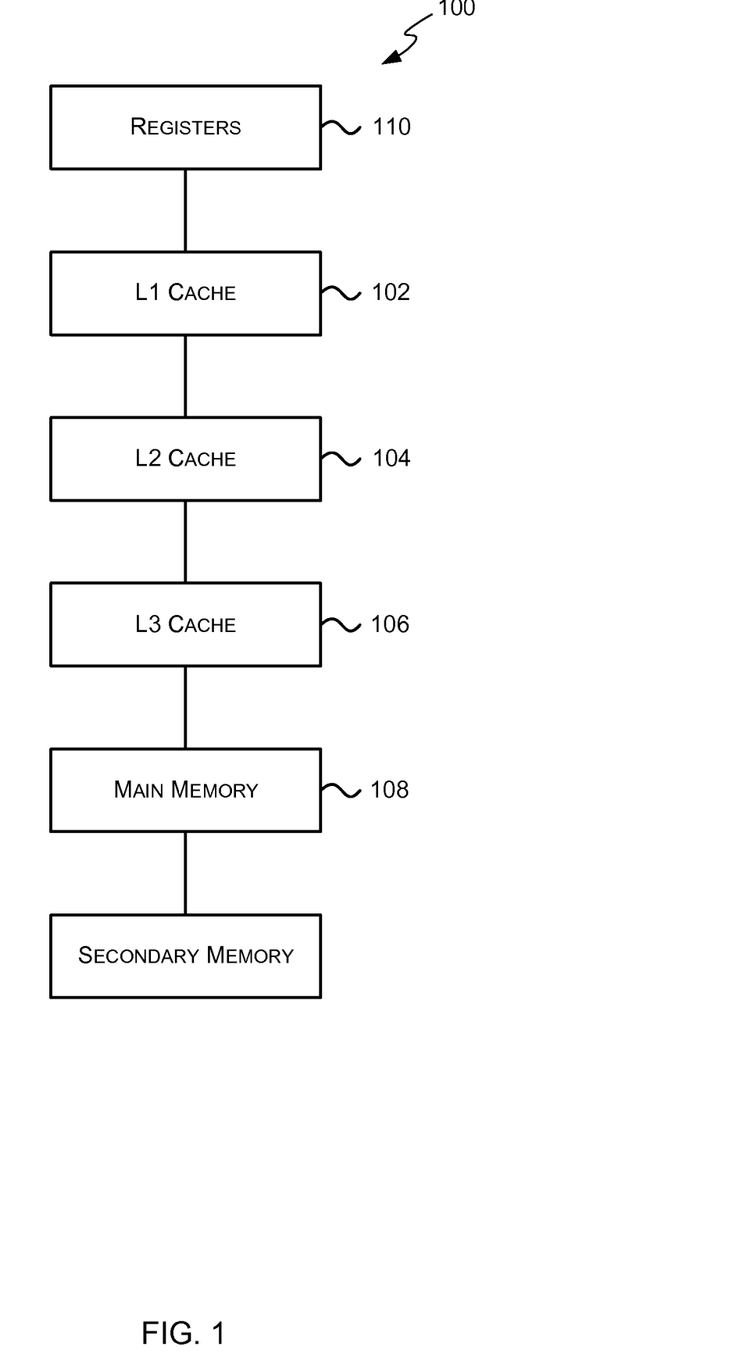
FIG. 1 is a schematic diagram of an example memory hierarchy.

In order to reduce the latency associated with accessing data stored in main memory, processors typically have one or more caches, as shown in the example memory hierarchy 100 in FIG. 1. There are typically two levels of on-chip cache, L1 102 and L2 104 which are usually implemented with SRAM (static random access memory) and one level of off-chip cache, L3 106. The caches are smaller than the main memory 108, which may be implemented in DRAM, but the latency involved with accessing a cache is much shorter than for main memory, and gets shorter at lower levels within the hierarchy (i.e. closer to the processor). As the latency is related, at least approximately, to the size of the cache, a lower level cache (e.g. L1) is smaller than a higher level cache (e.g. L2).

When a processor, or more particularly an ALU (arithmetic logic unit) within a processor, accesses a data item, the data item is accessed from the lowest level in the hierarchy where it is available. For example, a look-up will be performed in the L1 cache 102 and if the data is in the L1 cache, this is referred to as a cache hit. If however, the data is not in the L1 cache (the lowest level cache), this is a cache miss and the next levels in the hierarchy are checked in turn until the data is found (e.g. L2 cache 104, followed by L3 cache 106, if the data is also not in the L2 cache). In the event of a cache miss, the data is brought into the cache (e.g. the L1 cache 102) and if the cache is already full, a replacement algorithm may be used to decide which existing data will be evicted (i.e. removed) in order that the new data can be stored. Typically, this replacement algorithm selects the least-recently used (LRU) line within the cache.

In a multi-threaded processor, some of the resources within the processor are replicated (such that there is an instance of the resource for each thread) and some of the resources are shared between threads. Typically the cache resources are shared between threads but this can lead to conflicts where one thread fills the cache with data. As described above, as data is added to an already full cache this results in the eviction of data which is being used by other threads. A solution to this is to partition the cache between threads, so that each thread has a separate, dedicated portion of the cache which is not visible to other threads.

The embodiments described below are not limited to implementations which solve any or all of the disadvantages of known methods of managing access to memory.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Fill partitioning of a shared cache is described. In an embodiment, all threads running in a processor are able to access any data stored in the shared cache; however, in the event of a cache miss, a thread may be restricted such that it can only store data in a portion of the shared cache. The restrictions to storing data may be implemented for all cache miss events or for only a subset of those events. For example, the restrictions may be implemented only when the shared cache is full and/or only for particular threads. The restrictions may also be applied dynamically, for example, based on conditions associated with the cache. Different portions may be defined for different threads (e.g. in a multi-threaded processor) and these different portions may, for example, be separate and non-overlapping. Fill partitioning may be applied to any on-chip cache, for example, a L1 cache.

A first aspect provides a method of managing memory in a processor, the method comprising: allowing unrestricted access to any data stored in a shared cache in the processor; and in response to a cache miss event associated with a thread running in the processor, using a fill partitioning policy to select a location within a defined portion of the shared cache; and storing content of a memory location associated with the cache miss event in the selected location in the shared cache; and dynamically switching on and off use of the fill partitioning policy to select a location based on one or more of: thread ID and cache conditions.

A second aspect provides a processor comprising: a shared cache; and memory management logic arranged to manage access to memory including the shared cache and to allow unrestricted access to any data stored in the shared cache, wherein the memory management logic comprises fill partitioning logic arranged, in response to a cache miss event associated with a thread running in the processor, to use a fill partitioning policy to select a location within a defined portion of the shared cache; and to store content of a memory location associated with the cache miss event in the selected location in the shared cache, and wherein the memory management logic is further arranged to dynamically switch on and off use of the fill partitioning logic based on one or more of: thread ID and cache conditions.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

This acknowledges that firmware and software can be separately used and valuable. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

As described above, in a multi-threaded processor, cache resources are typically shared between threads but this can result in conflicts where one thread stores lots of data in a cache which causes the eviction of data used by other threads. This is a situation which is referred to as 'cache thrashing'. In order to prevent this, the cache may instead be partitioned between the threads in a fixed way and where this is implemented, each thread can only see (and hence store) data in its corresponding portion of the cache. Although this addresses the conflicts, partitioning in this way reduces the amount of cache which is available to each thread and can impact efficient use of the cache, for example, where one or more of the threads have an ideal cache allocation which is higher than other threads in the multi-threaded processor and which is also higher than the size of the partitioned cache. Additionally, if more than one thread is using the same data, partitioning of the cache leads to the data being replicated (i.e. being stored in the partition for each thread which is using the data), which is inefficient. In some implementations, the use of a partitioned cache may result in cache maintenance operations having to be performed on each partition in turn.

The following paragraphs describe a multi-threaded processor in which a cache, such as the L1 cache, is shared between threads and each thread can see (e.g. access) the entire cache. This enables threads to share data items and avoids the need to replicate the same data item within the same cache (as would be required if the cache was partitioned as described above). A policy, referred to herein as a 'fill partitioning policy', is then used to limit where each thread can store data within the shared cache e.g. in the event of a cache miss. In an example, the fill partitioning policy may comprise a modified or augmented replacement algorithm (which may also be referred to as a modified/augmented replacement policy) as described in more detail below. Using this fill partitioning policy, each thread is only able to store data in a particular part of the cache, and in some example, the portions allocated to each thread may be non-overlapping. The term 'fill partitioning' is used (in relation to the shared cache) because the partitioning only impacts the filling of the shared cache (i.e. the storing of data in the cache) and not access to the data which is stored in the cache. As described in more detail below, the fill partitioning policy may be implemented whenever data is stored in the cache (i.e. following every cache miss) or only when it is necessary to evict existing data (using a replacement algorithm/policy) in order to store the data in the cache (e.g. where the cache is full or where all possible locations where a particular line of data can be stored are already full, for example all four possible locations in a four-way set associative cache).

In some examples, the fill partitioning may be fixed (i.e. pre-determined) and each thread may have a fixed sized portion of the cache in which it can store data in the event of a cache miss. The sizes of the portions may be the same for all threads or threads may have different sized portions of the cache where they are able to store data. Alternatively, the fill partitioning may be dynamic in the sense that the fill partitioning policy (e.g. the modified/augmented replacement algorithm) may only be used in certain situations (e.g. where there are a large number of conflicts) and/or in the sense that the share of the cache which is allocated to a thread by the fill partitioning policy may change over time based on one or more criteria. In some implementations, the control of the fill partitions may be implemented such that the sizes of the portions may be updated at any time, while a thread is operating or not. The dynamic control of the size of the portions (which may operate automatically) may be implemented in hardware (e.g. specific hardware logic arranged to dynamically adapt the sizes of portions) or software (e.g. software which monitors operations and automatically updates the sizes of the portions). Where software is used, this software may form part of an operating system.

The fill partitioning policy may be applied to all threads within the multi-threaded processor or in other examples, the policy may be switched on and off individually for each thread. Where the fill partitioning policy is implemented for some threads and not others, all threads are able to see all the data stored in the cache (e.g. the L1 cache) but different threads will have different restrictions about where they are able to store data (e.g. anywhere in the cache or in only a particular portion of the cache which is dependent upon the identity of the thread).

The thread ID of a thread may be used to determine whether to apply the fill partitioning policy. When applying the fill partitioning policy, the thread ID (of a thread) may be used to determine what portion of the cache may be used by the thread to store data. The thread ID does not need to be used when looking for data in the cache or reading data from the cache because the entire cache is visible to all threads.

Figure 2:
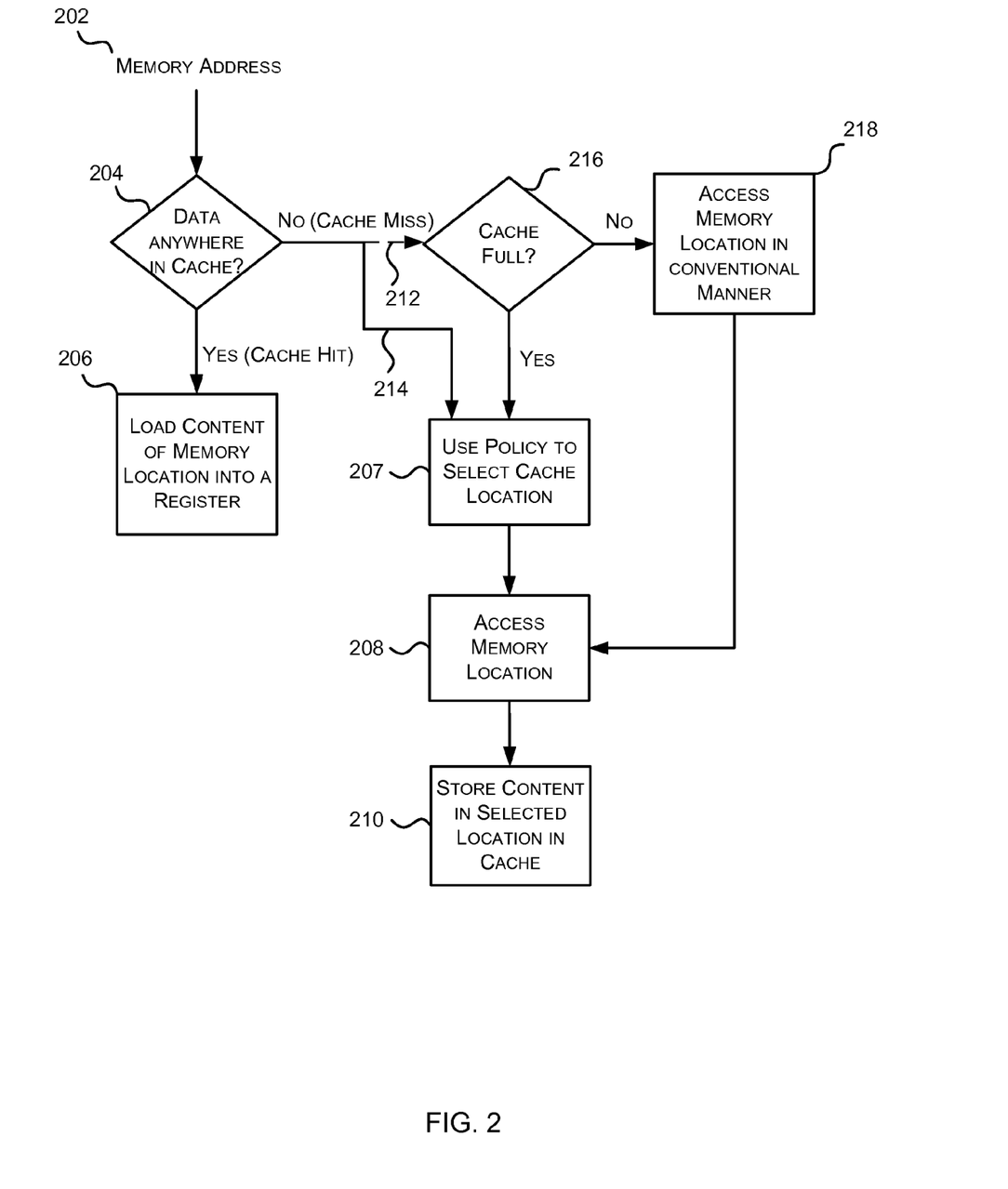
FIG. 2 is a flow diagram showing example methods of cache management.

FIG. 2 is a flow diagram showing example methods of cache management which, as described above, may be implemented for one or more levels of cache within a multi-threaded processor. This method may be implemented in hardware logic within the processor (e.g. within a cache management unit in the processor). The method takes as an input a memory address 202 which a thread generates when the thread wants to read from the address or write to the address. The input may also comprise an identifier for the particular thread (e.g. a thread ID). If the data is found anywhere in the cache ('Yes' in block 204), this is a cache hit and the content of the memory location is loaded into a register associated with the thread (block 206, e.g. one of the registers 110 shown in FIG. 1). If, however, the data is not already in the cache ('No' in block 204), this is a cache miss and the data needs to be accessed from another level in the memory hierarchy. Two variations of the latter stages of the cache management method are shown in FIG. 2.

In a first example, when a cache miss occurs ('No' in block 204 and following arrow 214), the fill partitioning policy is used (in block 207) to select a cache location and then (or in parallel with block 207), the data corresponding to the memory address 202 is accessed from a lower level in the memory hierarchy (block 208), e.g. from the main memory 108 or a higher level cache (as L1 cache may be considered to be the lowest level cache), and stored in the selected location in the cache (block 210). The selection of a cache location (in block 207) is described in more detail below with reference to FIGS. 3 and 4.

In a second example (where the process flow in FIG. 2 is indicated by dotted arrow 212 instead of solid arrow 214), the fill partitioning policy is only used if the cache is full. This example, therefore, contains an additional decision point (block 216). If the cache is not full ('No' in block 216), a free location (or slot) in the cache is identified in a conventional manner (block 218) and then (or in parallel with block 218), the data corresponding to the memory address 202 is accessed from a lower level in the memory hierarchy (block 208), e.g. from the main memory 108 or a higher level cache, and stored in the selected location in the cache (block 210). If, however, the cache is full ('Yes' in block 216), the fill partitioning policy is used (in block 207) to select a cache location and then (or in parallel with block 207), the data corresponding to the memory address 202 is accessed from a lower level in the memory hierarchy (block 208), e.g. from the main memory 108 or a higher level cache, and stored in the selected location in the cache (block 210).

Figure 3:
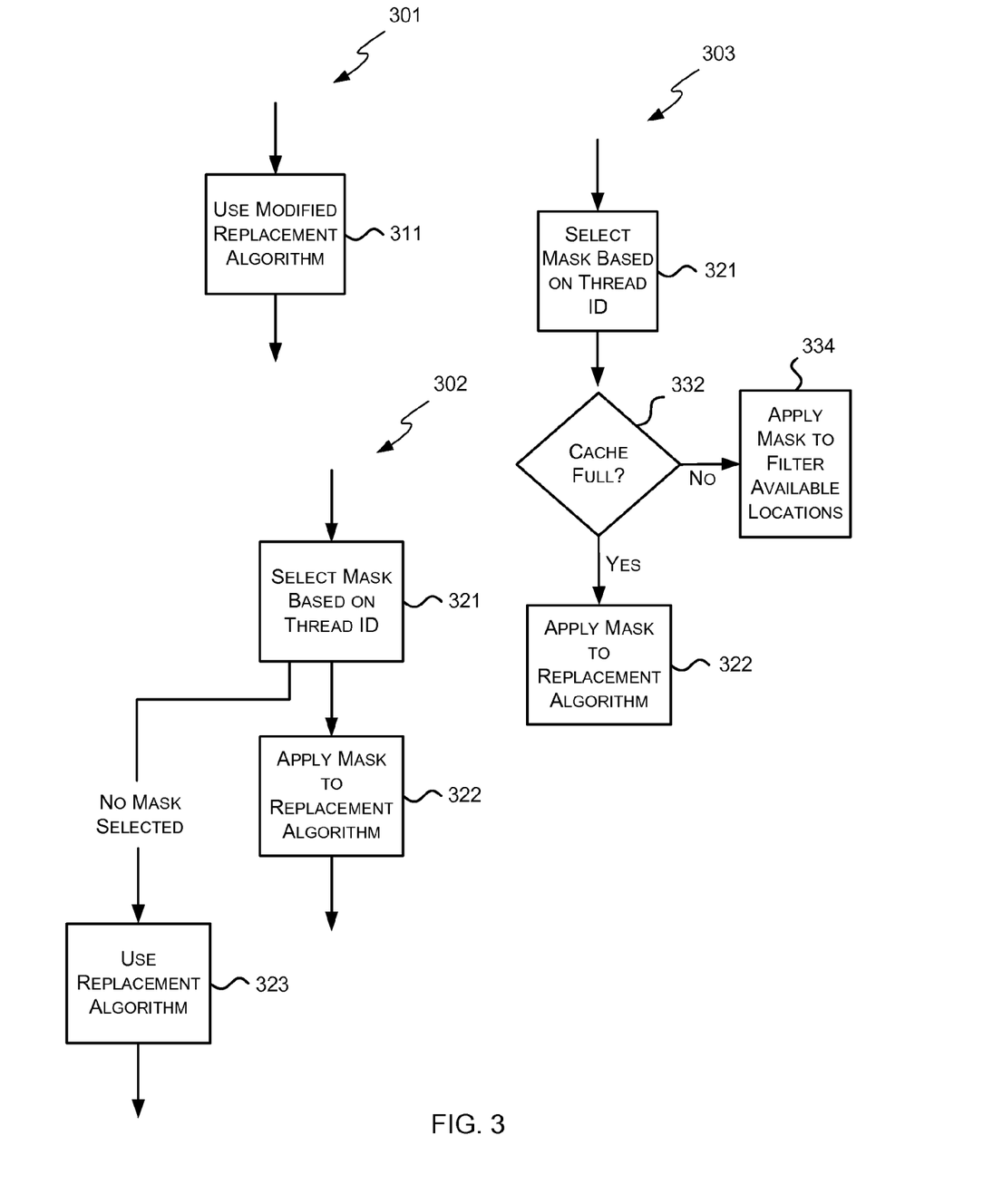
FIG. 3 shows three example methods by which a cache location may be selected using a fill partitioning policy.

FIG. 3 shows three example methods by which a cache location may be selected (for use to store data) using the fill partitioning policy (as in block 207 in FIG. 2). Of these three examples, the first two (examples 301 and 302) show how an existing replacement algorithm (or replacement policy) may be modified (in example 301) or augmented (in example 302) in order to select a location within the cache to store data and the third example 303 shows how the method of selecting an available slot in the cache may be augmented in order to implemented the fill partitioning policy. Any of these methods may be used in the methods shown in FIG. 2. It will be appreciated that the fill partitioning policy may be implemented in other ways not shown in FIG. 3 and aspects of any of the examples shown in FIG. 3 may be combined in any way.

In the first example 301, a modified replacement algorithm is used to select a cache location (block 311). This modified replacement algorithm may, for example, be based on a LRU (least-recently used) algorithm or not most-recently used (MRU) algorithm. In an example, the replacement algorithm may be modified such that when partitioning is enabled, each thread is only allowed to fill to a single way and in this case the algorithm returns a fixed value achieving this.

In the second example 302, a mask is selected based on the ID of the thread which generated the memory address 202 (block 321) and this mask is then applied to a replacement algorithm (block 322) e.g. to a conventional replacement algorithm such as LRU or not-MRU. Each mask segments or divides up the cache and indicates the locations where the particular thread can and/or cannot store data. Each thread's mask (i.e. the masks selected in block 321 for each thread) may be different or two or more threads may use the same mask. In some examples the areas defined for storage by each thread may be non-overlapping although in other examples, more than one thread may have a mask which allows them to store data in the same location (or set of locations) in the cache. In some examples, the partitioning of the cache by the masks (or by any other means, such as the modified algorithm in the first example 301) may be related to the structure of the cache, as in the examples shown in FIG. 4.

Figure 4:
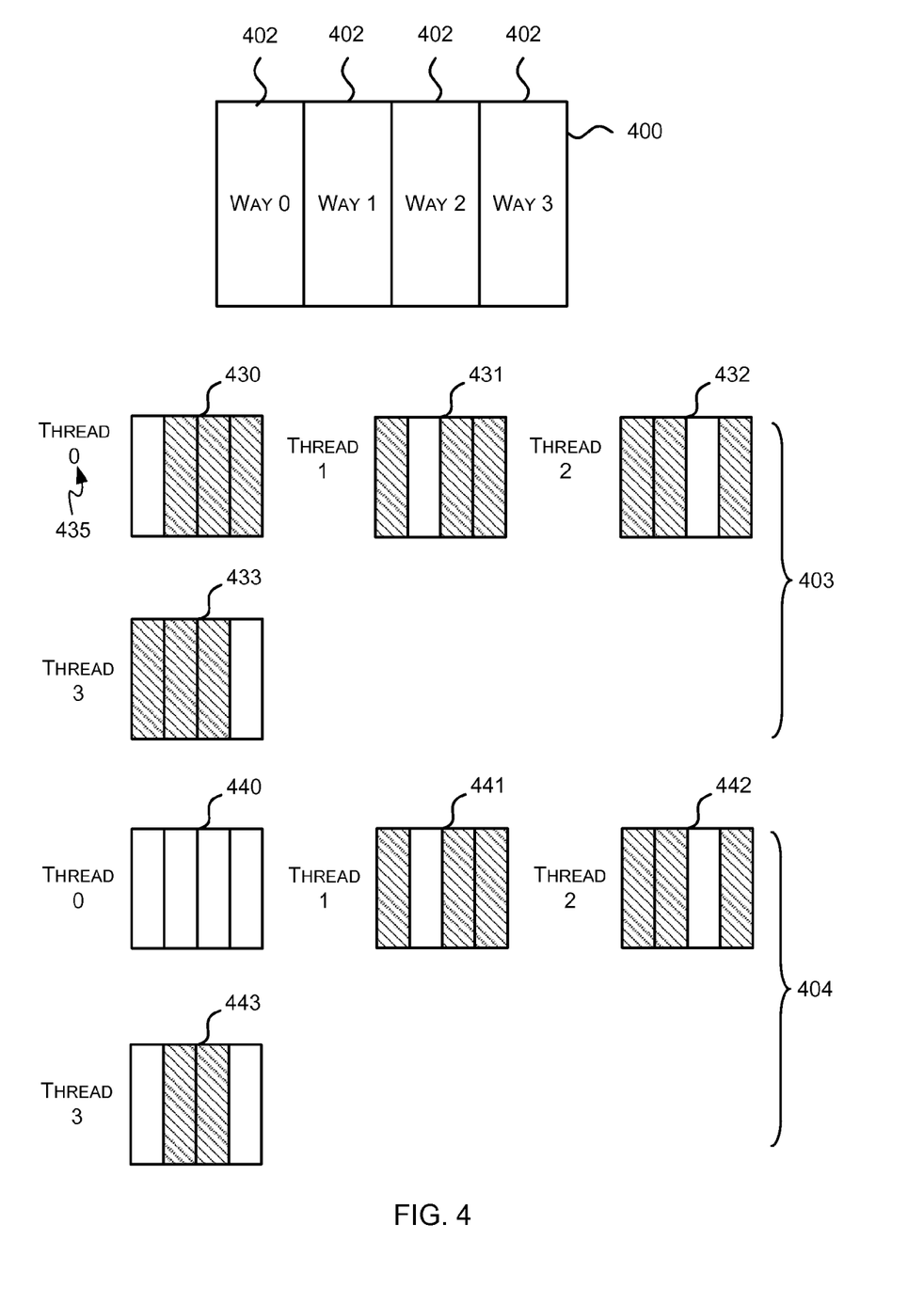
FIG. 4 shows a schematic diagram of a cache and two example sets of masks which may be used when implementing a fill partitioning policy.

FIG. 4 shows a schematic diagram of a cache 400 which is divided into four ways 402. A way is a section of a cache and is conventionally defined in order to organize a cache, in particular a set-associative cache, so that it is easier to search for data in a cache. In a set-associative cache, a particular line in a page in the main memory 108 may be stored in a corresponding line in any of the ways (e.g. line 0 in a main memory page may be stored in line 0 of any way). If the memory is a x-way set-associative cache (e.g. where x=4), the cache comprises x ways (e.g. four ways 402, as in FIG. 4) and a line in a main memory page can be stored in one of x locations (e.g. in one of four locations), one location being in each of the ways. In such an arrangement, when searching for a memory address in a cache, it is only necessary to look in x locations, rather than looking in every location in the cache (as would be the case for fully-associative caches).

FIG. 4 also shows two example sets of masks 403, 404, with each set comprising four masks. In this example each mask masks one or more of the ways (so that it cannot be used to store data) such that the partitioning of the cache which is implemented by a mask aligns to the boundaries of the ways (i.e. an entire way is either available to a thread to store data or not available); however in other examples the mask partitioning may not be linked to way boundaries (i.e. a portion of a way may be available to a thread or a portion of multiple ways) or the masks may be used with caches which are not organized using ways (e.g. for a fully-associative cache or a direct mapped cache).

The first example set of masks 403 comprises four masks 430-433 and each mask is associated with a thread ID 435. The first mask 430 allows the first thread, Thread 0, to store data in the first way (WAY 0), the second mask 431 allows the second thread, Thread 1, to store data in the second way (WAY 1), etc. In this example set of masks, each mask defines a separate, non-overlapping area for a thread to store data and the areas where each thread is allowed to store data are the same size.

The second example set of masks 404 also comprises four masks 440-443 and again each mask is associated with a thread ID. In this example, the first mask 440 allows the first thread, Thread 0, to store data in any of the ways (i.e. none of the ways are shown with shading in the diagram), the second mask 441 allows the second thread, Thread 1, to store data in the second way, the third mask 442 allows the third thread, Thread 2, to store data in the third way (WAY 2) and the fourth mask 443 allows the fourth thread, Thread 3, to store data in the first and fourth ways (WAY 0 and WAY 3). In this example set of masks, the masks define different areas for each thread to store data but these areas are at least partially overlapping. The second set of masks also shows how the areas which are defined may be of different sizes (e.g. the area for Thread 1 is largest and the areas for Threads 1 and 2 are the same size). It will be appreciated that the sets of masks shown in FIG. 4 are provided by way of example and aspects of either set may be combined in any way to create different sets (e.g. a set where the areas defined by the masks are non-overlapping but of different sizes or a set where the areas are overlapping and of the same size).

Although in the example sets of masks shown in FIG. 4 there are the same number of masks as there are threads (i.e. four), in other examples there may be more/fewer masks than threads.

There are many different ways that the mask data may be stored and applied. In an example, each thread may be provided with a data register which includes a set of bits, each of which represent whether a cache way is available to that thread or not. These sets of bits may then be used to provide the masks (e.g. a bit '0' may be used to indicate that a way is available and a bit '1' may be used to indicate that a way should be removed from use for a thread).

In some examples, the masks may be configured when a program is created and stored as part of the program (i.e. in a data structure). However, where the sizes of portions may be dynamically adjusted, the masks may be generated dynamically or alternatively different masks/sets of masks may be selected from existing, pre-defined masks stored in a data structure.

As described above, the relationship between the thread ID and the mask which is selected (in block 321) may be fixed or may change (e.g. it may be dynamically configurable based on certain parameters). Examples of parameters which may be used include, but are not limited to, the number of cache misses (or miss-rate) for a thread, the number of cache fills (which are produced by misses) for a thread which remove another thread's data from the cache and the amount of data which is held in the cache as placed by a thread. One or more of these parameters may be monitored for each thread and then a mask (or set of masks) selected based on the values of the parameters. In some implementations, the process may step through several masks (or sets of masks) as the parameters alter (e.g. different masks may be selected in different iterations of block 321).

In some implementations of the second example 302, for some thread IDs, no mask may be selected (in block 321) such that the thread can select a memory location from anywhere within the cache (e.g. in block 323, using a conventional replacement algorithm), or alternatively a mask may be selected (in block 321 and applied in block 322) that enables the thread to select a memory location from anywhere within the cache (e.g. mask 440) in which case block 323 may be omitted from the second example 302. By selecting masks in this way based on thread ID, fill partitioning may be switched on/off for threads on an individual basis and which threads are implementing fill partitioning at any time may change over time (e.g. only those threads which start to overload the cache to the detriment of other threads may have fill partitioning switched on).

FIG. 3 also shows a third example method by which a cache location may be selected using a fill partitioning policy (example 303). In this example, the mask is selected (in block 321) based on thread ID before it is determined whether the cache is full (in block 332). If the cache is full ('Yes' in block 332), then the mask may be applied to a replacement algorithm (block 322) as described above and if the cache is not full ('No' in block 332), then the mask is applied to the available locations within the cache (block 334), so that the particular thread is limited as to where it can store a data item irrespective of whether the cache is full or not.

In some implementations, the mask which is selected based on thread ID (e.g. in block 321) may be combined with one or more other masks to create a combined mask before it is applied (e.g. to a replacement algorithm in block 322). These masks may be protecting elements of the cache for other purposes, such as lines locked in cache and pending line-fills.

Figure 5:
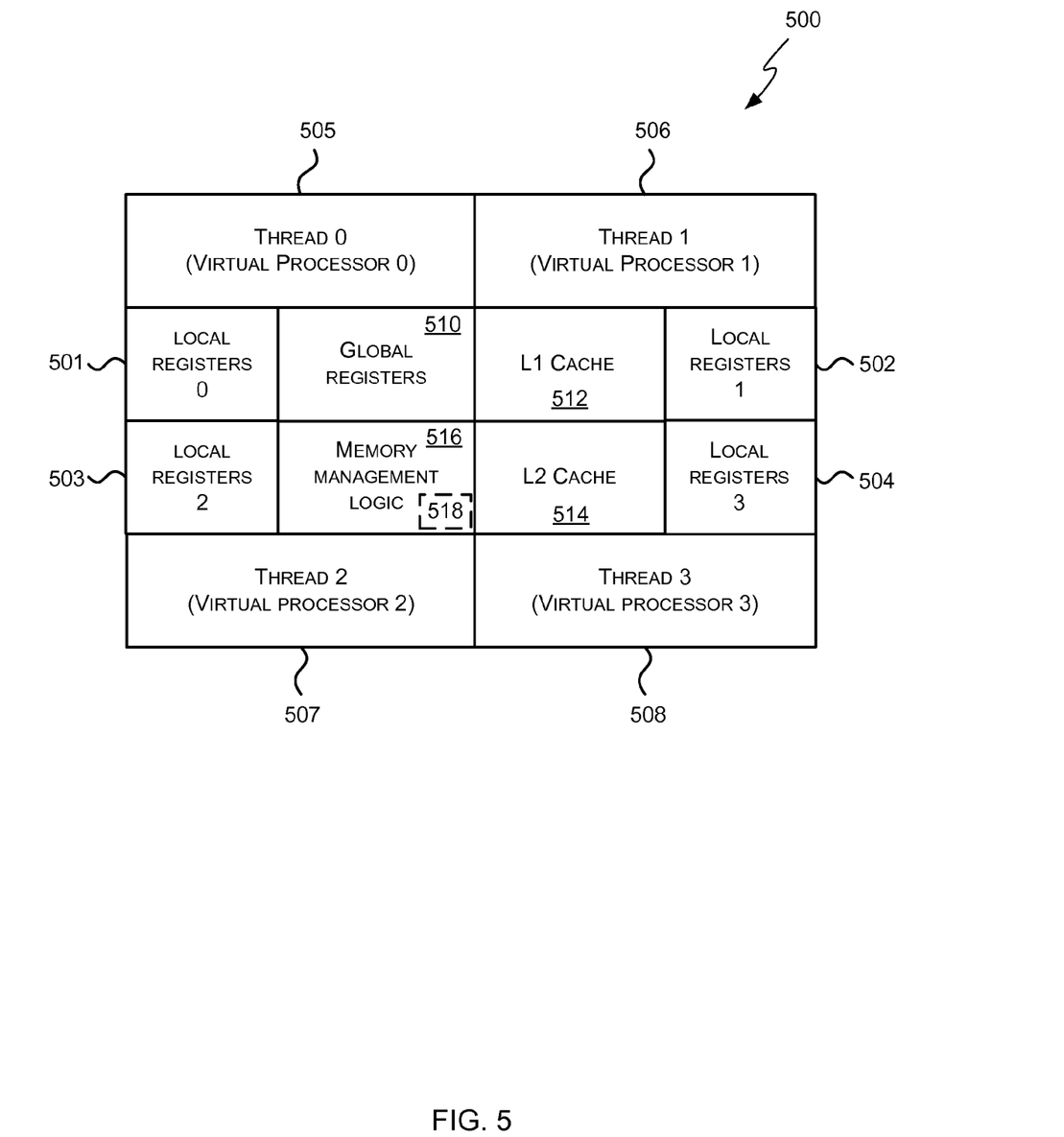
FIG. 5 shows a schematic diagram of a multi-threaded processor which may implement fill partitioning

FIG. 5 shows a schematic diagram of a multi-threaded processor 500 which may implement fill partitioning. The multi-threaded processor 500 comprises a number of groups of local registers 501-504 with each group of local registers (which may, for example, comprise 4 or 8 local registers) being associated with one of the threads 505-508. The multi-threaded processor 500 further comprises a number of global registers 510 (e.g. 8 or 16 global registers). The term 'global register' is used herein to refer to a register in a pool of registers which may be used by any of the threads and by any piece of code in the system in which the processor 500 is located. These global registers are an example of a global (or shared) resource within the processor (where a 'global resource' is any resource which is shared between threads). The processor 500 further comprises one or more levels of on-chip cache (e.g. a L1 cache 512 and a L2 cache 514) and hardware logic 516 to control access to the memory, including these caches. This logic 516 may be referred to as memory management logic or a cache management unit and may comprise a portion 518 of the hardware logic (which may be referred to as 'fill partitioning logic') which implements the fill partitioning methods described herein. As described above, the caches 512, 514 (or one or more of these caches) may be a shared resource and fill partitioning may be implemented in any or all of the shared on-chip caches.

It will be appreciated that a multi-threaded processor may contain other elements than those shown in FIG. 5.

The methods described above may be implemented in any or all of the on-chip caches within a processor. For example, fill partitioning may be used in a L1 cache (which is closest to the virtual processors) and not in the L2 cache. In another example, fill partitioning may be used in a L2 cache in addition to or instead of the L1 cache. Where the processor comprises more than two on-chip caches, fill partitioning may be implemented in any or all of these on-chip caches.

As described above, the use of fill partitioning may be constant (i.e. switched on permanently) or use of fill partitioning may be dynamically switched on and off for particular caches and/or particular threads (e.g. based on thread ID) according to pre-defined parameters and/or thresholds. These parameters and/or thresholds may relate to conditions associated with the cache (e.g. cache performance, cache load). For example, fill partitioning may be switched on/off (for the whole processor or particular threads) based on a rate of a cache misses for a thread, or a comparison of the rate of cache misses for different threads within a processor, or based on the amount of data that a thread is storing to a cache or the number of fills for a thread which evict another thread's data (this metric, although similar to the number of misses, specifically tracks the misses which are likely to directly affect another thread's usage of the cache). There may be many other examples of parameters or conditions in which fill partitioning may be dynamically applied.

In the methods described above and shown in FIGS. 2 and 3, the memory location is decided after the memory address has been identified and provided as an input. In some examples, however, the next memory location to be used in event of a cache miss may be decided ahead of time (e.g. using a variation of the methods described above), such that the memory location is determined before the memory address is received as an input (e.g. block 207 may be performed off-line and/or in advance of the other method steps shown in FIG. 2). Use of this pre-computation of the next memory location to be used to store data for a thread in the cache (e.g. using methods described with reference to FIGS. 3 and 4 above) may be used to eliminate any latency which may be introduced by the process of determining the appropriate memory location to use (e.g. in block 207).

Figure 6:
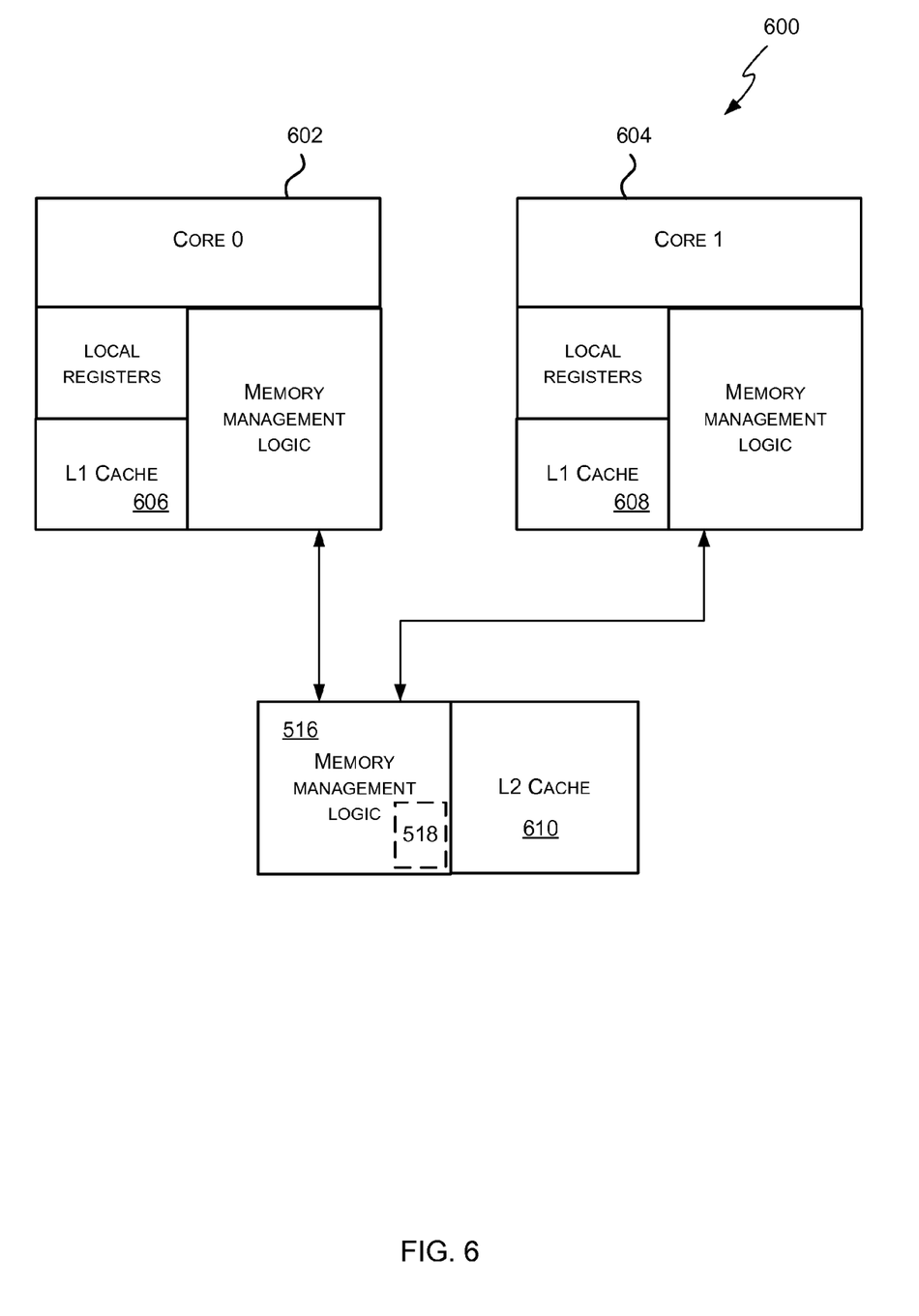
FIG. 6 shows a schematic diagram of an example multi-core processor which may implement fill partitioning.
Figure 7:
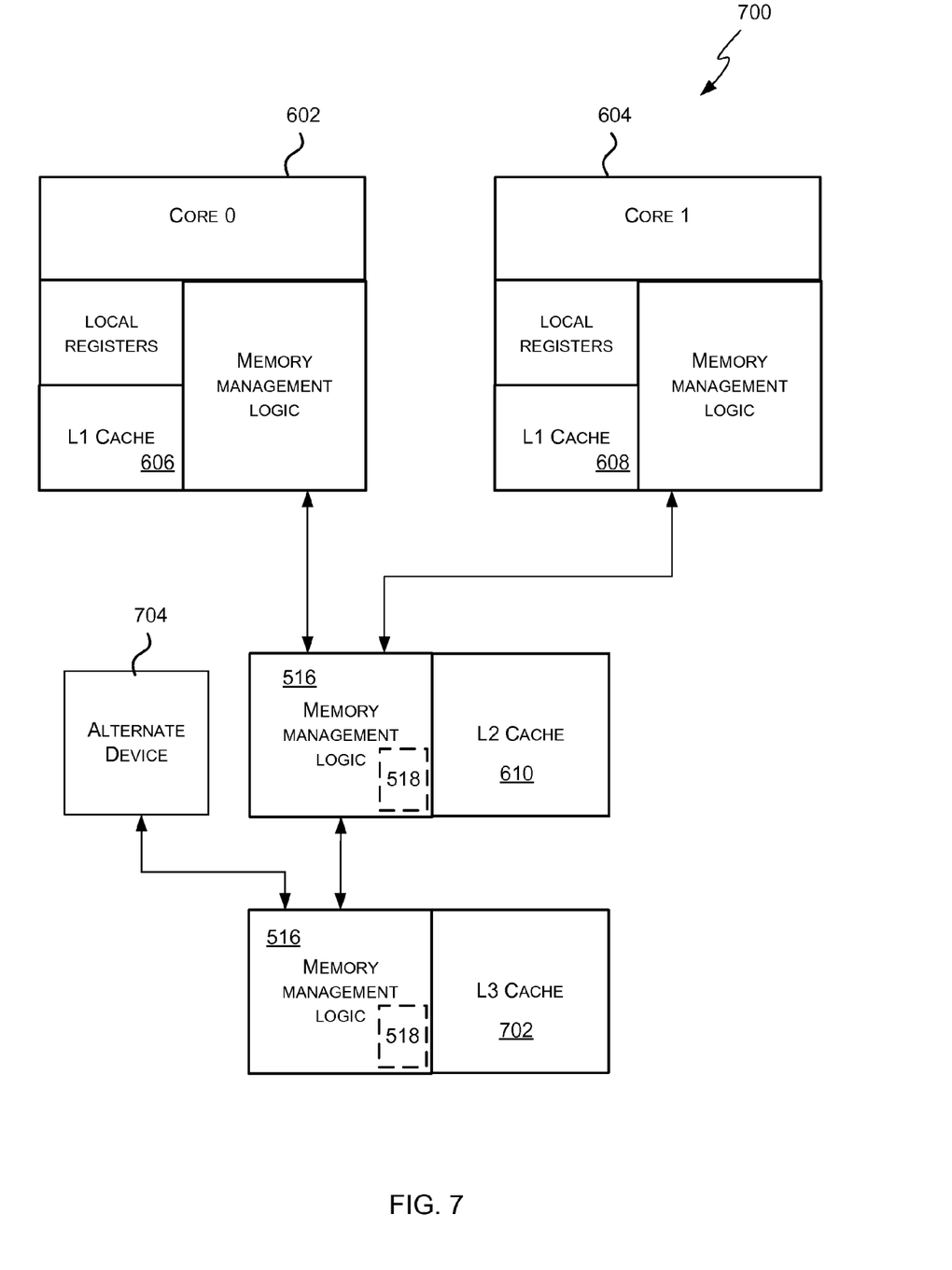
FIG. 7 shows a schematic diagram of another example multi-core processor which may implement fill partitioning.

Fill partitioning of a shared cache is described above with reference to a multi-threaded processor. The technique is also applicable to a multi-core processor where a cache (e.g. a L2 cache) is shared between multiple cores. FIGS. 6 and 7 shows schematic diagrams of example multi-core processors 600, 700 which may implement fill partitioning. The processor 600 shown in FIG. 6 comprises separate cores 602, 604 with unshared (i.e. separate) L1 caches 606, 608 and a shared L2 cache 610. In this example, there is memory management logic 516 comprising the fill partitioning logic 518 which is shared between the cores. The processor shown in FIG. 7 additionally includes an L3 cache 702 and the fill partitioning may be implemented for the L3 cache 702 in addition to, or instead of, the L2 cache 610. The processor 700 shown in FIG. 7 may additionally comprise an alternate device 704 (e.g. a GPU) which is any device which accesses memory and that would use the L3 cache 702 (e.g. the alternate device may comprise its own internal lower level caches). Where fill partitioning of a shared cache is implemented in a multi-core processor, the methods described above may be implemented on a per-core basis (e.g. such that masks are selected based on an ID of the core rather than the thread) and/or on a per-thread basis (e.g. where one or more of the cores is multi-threaded).

As described above, the fill partitioning technique allows any thread to see all held content in the shared cache, thereby retaining inherent coherent access to the shared resource. The mechanism only allows each thread to fill cache lines into a configured portion of the cache resource, preventing a single thread having the ability to fill the entire cache with its own content.

Depending upon implementation, the fill partitioning may be integrated into existing policies/algorithms (e.g. existing replacement algorithms) or overlaid as an extra policy which divides up the cache.

The term 'processor' and 'computer' are used herein to refer to any device, or portion thereof, with processing capability such that it can execute instructions. Those skilled in the art will realize that such processing capabilities are incorporated into many different devices and therefore the term 'computer' includes set top boxes, media players, digital radios, PCs, servers, mobile telephones, personal digital assistants and many other devices.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. [0056] Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to an item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. A method of managing memory in a processor, the method comprising:
    allowing unrestricted access to any data stored in a shared cache in the processor;
    in response to a cache miss event associated with a thread running in the processor, using a fill partitioning policy to select a location within a defined portion of the shared cache; and storing content of a memory location associated with the cache miss event in the selected location in the shared cache; and
    dynamically switching on and off use of the fill partitioning policy to select a location based on one or more of: thread ID and cache conditions,
    wherein the size of the defined portion of the shared cache allocated to the thread is adjusted dynamically while operations are in progress.

2. The method according to claim 1, further comprising using the fill partitioning policy following each cache miss event.

3. The method according to claim 1, further comprising using the fill partitioning policy to select the location within the defined portion of the shared cache only when the shared cache is full.

4. The method according to claim 1, wherein using a fill partitioning policy to select a location within a defined portion of the shared cache comprises using a modified replacement algorithm arranged to select a location within the defined portion associated with the thread.

5. The method according to claim 1, wherein using a fill partitioning policy to select a location within a defined portion of the shared cache comprises:
    selecting a mask based on an identifier of the thread, the mask defining a portion of the shared cache.

6. The method according to claim 5, further comprising, if the shared cache is full, applying the selected mask to a replacement algorithm.

7. The method according to claim 5, further comprising, if the shared cache is not full, applying the selected mask to filter available locations within the shared cache.

8. The method according to claim 5, wherein the selecting comprises selecting the mask from a set of stored pre-defined masks.

9. The method according to claim 8, wherein each mask in the set of stored pre-defined masks defines a different portion of the shared cache.

10. The method according to claim 1, wherein the cache conditions comprise one of: cache performance, cache load, a rate of cache misses for a thread, a comparison of rates of cache misses for different threads, an amount of data that a thread is storing to a cache, and a number of fills for a thread which evict another thread's data from a cache.

11. The method according to claim 1, further comprising switching fill partitioning on and off for threads on an individual basis.

12. A processor comprising:
    a shared cache; and
    memory management logic arranged to manage access to memory including the shared cache and to allow unrestricted access to any data stored in the shared cache, wherein the memory management logic comprises fill partitioning logic arranged, in response to a cache miss event associated with a thread running in the processor, to use a fill partitioning policy to select a location within a defined portion of the shared cache; and to store content of a memory location associated with the cache miss event in the selected location in the shared cache,
    wherein the memory management logic is further arranged to dynamically switch on and off use of the fill partitioning logic based on one or more of: thread ID and cache conditions, and
    wherein the size of the defined portion of the shared cache allocated to the thread is adjusted dynamically while operations are in progress.

13. The processor according to claim 12, wherein the fill partitioning policy is used following each cache miss.

14. The processor according to claim 12, wherein the fill partitioning policy is only used to select the location when the shared cache is full.

15. The processor according to claim 12, wherein using a fill partitioning policy to select a location within a defined portion of the shared cache comprises using a modified replacement algorithm arranged to select a location within the defined portion associated with the thread.

16. The processor according to claim 12, wherein using a fill partitioning policy to select a location within a defined portion of the shared cache comprises:
    selecting a mask based on an identifier of the thread, the mask defining a portion of the shared cache.

17. The processor according to claim 12, wherein the processor is a multi-threaded processor.

18. The processor according to claim 12, further comprising multiple processing cores.

19. The processor according to claim 12, wherein the shared cache is a L1 cache.

* * * * *